E. M. WARRENFELTZ.
MANURE LOADER.
APPLICATION FILED APR. 7, 1910.
998,058.
Patented July 18, 1911.
4 SHEETS—SHEET 1.
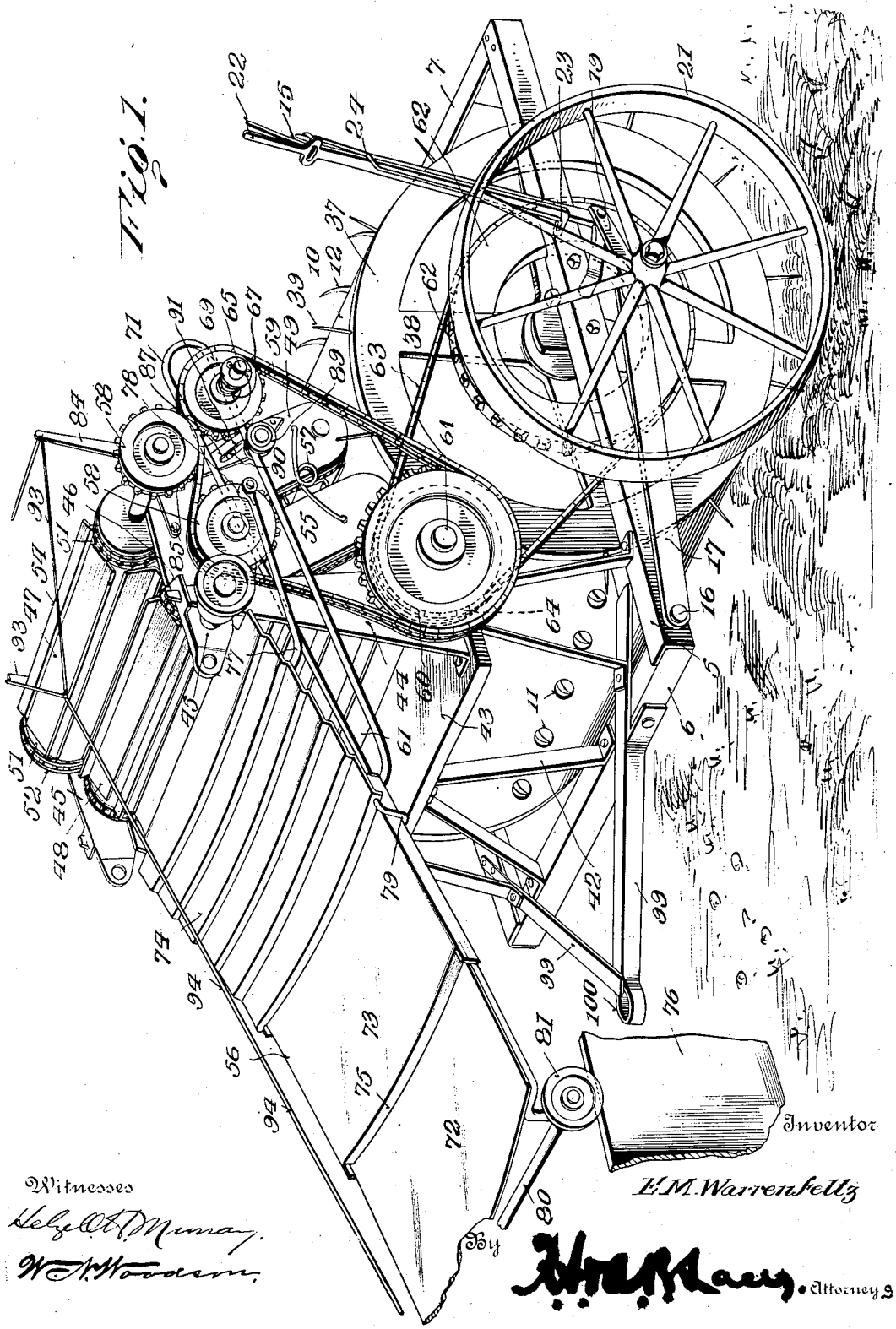

E. M. WARRENFELTZ.
MANURE LOADER.
APPLICATION FILED APR. 7, 1910.
998,058.
Patented July 18, 1911.
4 SHEETS—SHEET 2.
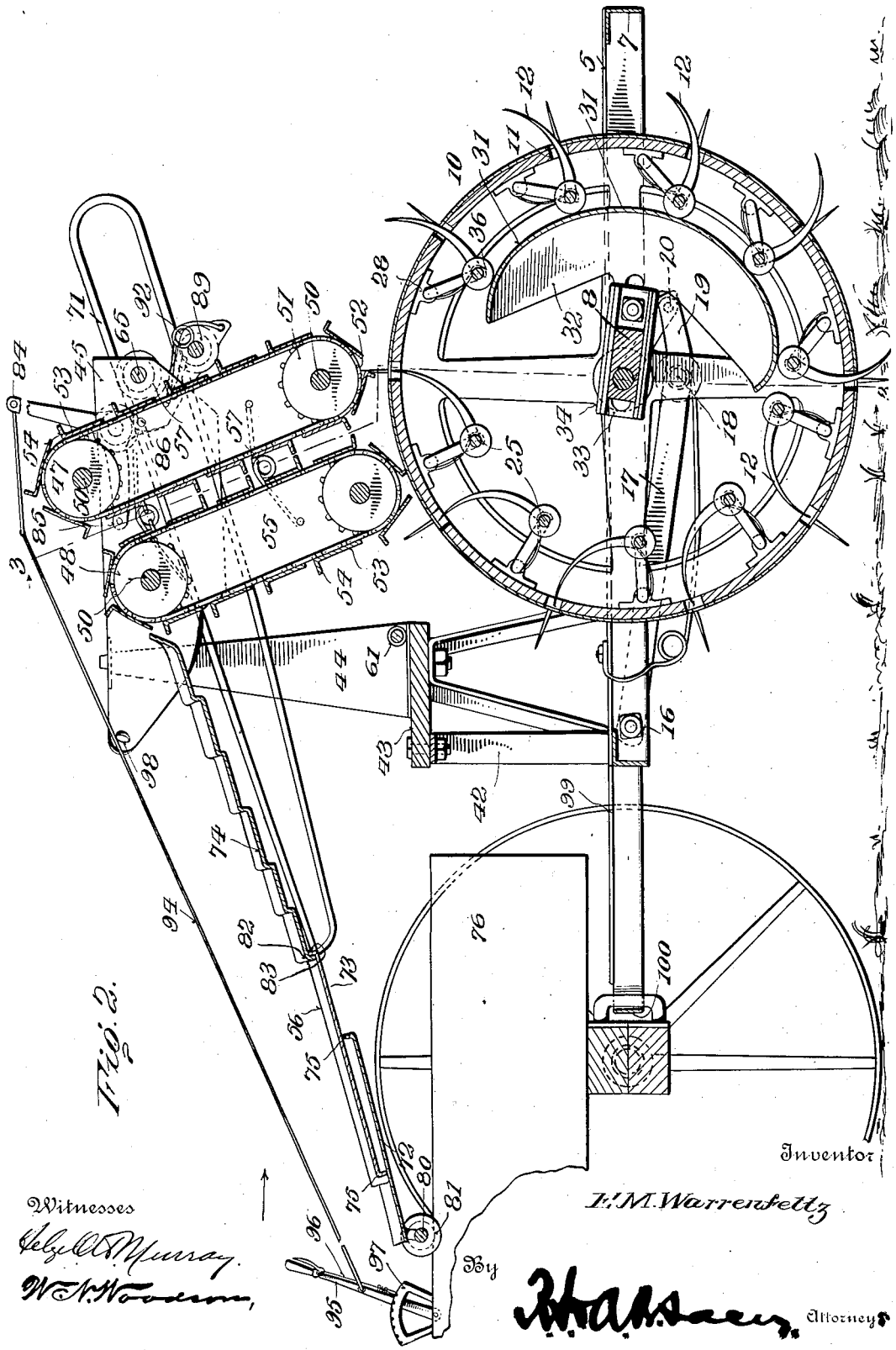

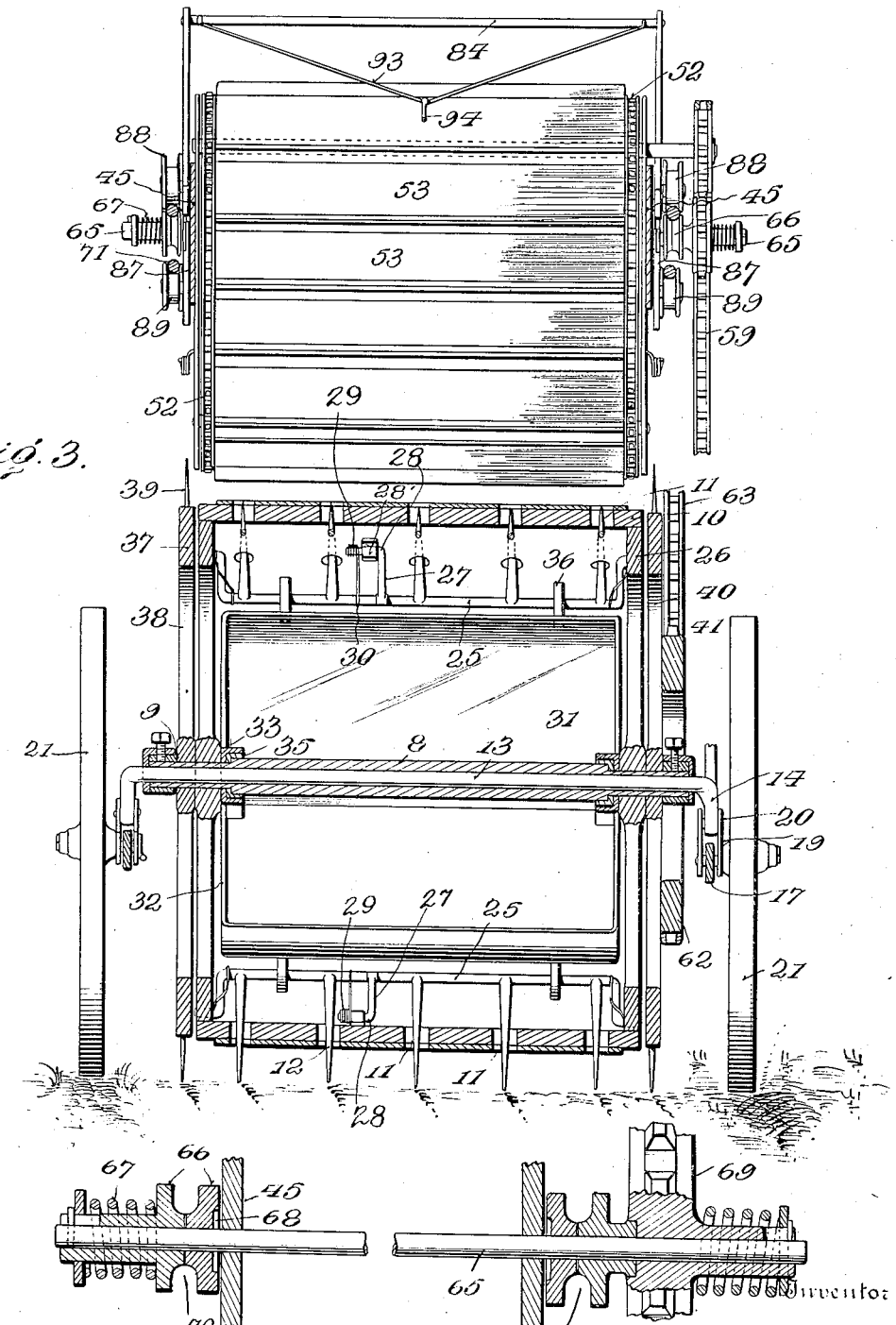

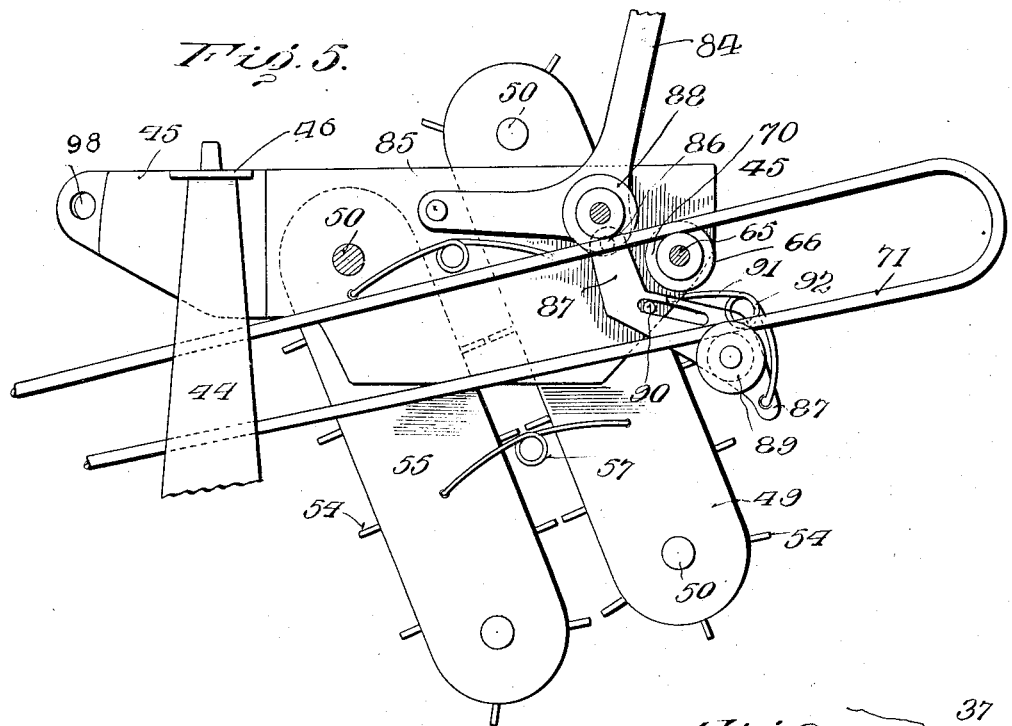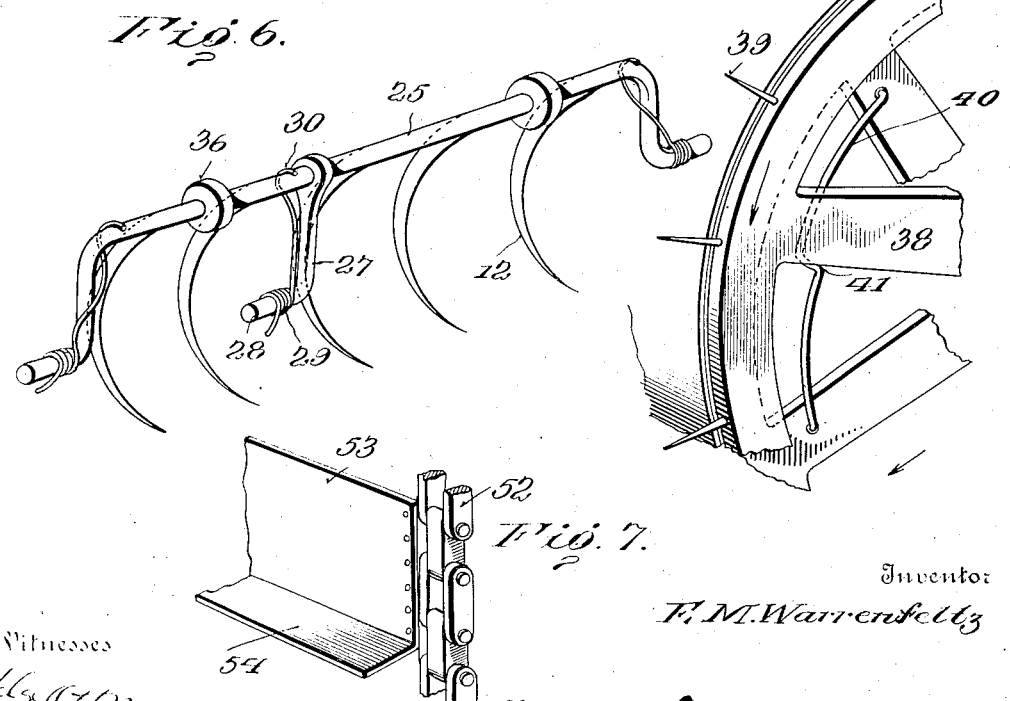

UNITED STATES PATENT OFFICE.

EDWARD M. WARRENFELTZ, OF FUNKSTOWN, MARYLAND.

MANURE-LOADER.

998,058.  Specification of Letters Patent.  Patented July 18, 1911.

Application filed April 7, 1910. Serial No. 553,987.

*To all whom it may concern:*

Be it known that I, EDWARD M. WARRENFELTZ, citizen of the United States, residing at Funkstown, in the county of Washington and State of Maryland, have invented certain new and useful Improvements in Manure-Loaders, of which the following is a specification.

This invention relates to loading devices and more particularly to a machine especially designed for gathering manure and loading the same on a spreader, wagon or other vehicle.

The object of the invention is to provide a manure loader including a truck having a drum mounted for rotation thereon and provided with peripheral gathering devices, means being provided for conveying the manure elevated by the gathering devices to a suitable point of discharge.

A further object is to provide an extensible chute for conducting the manure to a wagon or other vehicle, and means for moving the chute to extended and retracted positions, thereby to permit loading of the wagon from the center thereof toward either end or from either end of said wagon toward the center thereof.

A further object is to provide a chute formed of a plurality of extensible sections, one of which constitutes a shaking table and serves to agitate the manure or other material deposited thereon.

A further object is to provide a drum having co-acting conveyers mounted for rotation above the same and adapted to receive the manure from the gathering devices and deliver the same to the chute, or feed the manure directly to a spreader.

A further object is to provide means for yieldably supporting one of the conveyers, thereby to allow a limited lateral movement thereof in case a stone or other foreign body is elevated with the manure and thus prevent breakage of said conveyer.

A further object is to provide means for permitting rearward movement of the machine without affecting the gathering devices.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a manure loader constructed in accordance with my invention; Fig. 2 is a longitudinal sectional view; Fig. 3 is a vertical sectional view, the conveyers being shown in elevation; Fig. 4 is a detail longitudinal sectional view of the transverse shaft, showing the clutch members for advancing and retracting the chute; Fig. 5 is a side elevation of the co-acting conveyers; Fig. 6 is a detail perspective view of one of the crank shafts with the gathering devices or spurs in position thereon; Fig. 7 is a detail perspective view of one of the flights of the conveyer; Fig. 8 is a detail perspective view, showing the pawl for locking the traction disk in engagement with the drum.

Corresponding and like parts are referred to in the following description and indicated in all the views of the drawings by the same reference characters.

The device comprises a substantially rectangular supporting frame preferably formed of angle iron and including spaced side bars 5 connected in any suitable manner by end bars 6 and 7. Extending transversely across the frame is a stationary shaft 8 having its intermediate portion of substantially rectangular cross sectional formation, as shown in Fig. 2 of the drawings and its opposite ends provided with reduced trunnions 9 seated in suitable bearings in the side bars 5. Mounted for rotation on the trunnions 9 is a drum or cylinder 10 having its rim formed with a series of rows of transverse openings 11 to permit the passage of gathering devices or spurs 12, the latter being adapted to collect the manure and elevate the same as the machine travels over the surface of a field or other inclosure.

Extending transversely through the shaft 8 is an axle 13 having its opposite ends projected beyond the trunnions 9 and provided with crank arms 14, one of which terminates in an operating lever 15, as best shown in Fig. 1 of the drawings. Pivotally mounted at 16 on the side bars 5 of the frame are bars 17 to which are pivotally connected at 18 the adjacent ends of links 19, the opposite ends of the links 19 being pivotally connected at 20 to the adjacent crank arms 14. The pivots 18 are preferably extended laterally to form stub axles on which are journaled ground wheels 21.

Extending parallel with the operating lever 15 is a locking lever 22 having it upper end connected to the lever 15 and its lower end enlarged and provided with a transverse slot 23. A spring 24 extends across the face of the locking lever 22 with one end thereof secured to said locking lever and its other end extended through the slot 23 for attachment to the locking lever 15. The tension of the spring 24 is such as to normally and yieldably retain the slotted end of the locking lever in the path of the supporting frame of the truck so as to hold said supporting frame in lowered position and thus permit the active ends of the spurs 12 to engage the ground when the device is in use. In order to raise the supporting frame and thus elevate the active ends of the spurs 12 above the ground when transferring the machine from place to place, it is merely necessary to press laterally on the upper end of the locking lever 22 which disengages the slotted end of said locking lever from the adjacent side bar of the supporting frame, when a downward pressure exerted on the operating lever 15 will cause the crank arms 14 and links 19 to be moved to a position in vertical alinement to each other and in which position the supporting frame carrying the drum will be elevated.

The gathering devices or spurs 12 are rigidly secured to suitable crank shafts 25 disposed within the drum or cylinder 10, the opposite ends of the crank shafts 25 being journaled in the side walls 26 of the drum, as best shown in Fig. 3 of the drawings. Secured to each shaft 25, is an arm 27 having an angular extension 28, which latter is journaled in a clip or bearing 28', fastened to the inner wall of the drum. A coil spring 29 surrounds the angular extension 28 of each arm 27 with one end thereof bearing against the inner wall of the drum and its other end provided with a hooked terminal 30 which embraces the adjacent crank shaft 25 and serves to normally and yieldably hold the gathering devices or spurs 12 within the drum or cylinder 10.

As a means for successively moving the pointed ends of the spurs 12 outwardly through the openings 11 at predetermined intervals so as to elevate the manure or other material, there is provided an actuating member or cam 31 including spaced brackets 32 having slotted arms 33 and provided with longitudinal flanges 34 which slidably engage suitable guide plates 35 secured to the opposite ends of the angular portion of the shaft 8. One or more rollers 36 are preferably mounted on each crank shaft 25 for engagement with the cam face of the actuating member 31 so as to reduce friction between the parts when the machine is in operation. Thus it will be seen that as the machine is caused to travel over the surface of a field or other inclosure, the rollers 36 will successively engage the cam face of the actuating member 31 and move the pointed ends of the spurs or gathering devices 12 outwardly through the openings 11 and thus collect the manure or other material on the ground, said material being carried up on the spurs 12 to a point approximately in vertical alinement with the shaft 8, at which point the rollers 36 will clear the actuating member or cam 31 so as to allow the springs 29 to automatically retract the spurs and move the same to inoperative position within the cylinder or drum 10, as best shown in Fig. 2 of the drawings.

Loosely mounted on the trunnions 9 are wheels or disks 37 having radiating spokes 38 and provided with peripheral traction devices or spurs 39 adapted to bite into the ground when the supporting frame is moved to lowered position.

Secured in any suitable manner to the opposite ends 26 of the revolving cylinder or drum, are spring pawls 40, the offset portions 41 of which are adapted to engage the spokes 38 of the members 37 when the machine is traveling in a forward direction so as to transmit motion from the members 37 to the drum or cylinder 10. When the machine is moved rearwardly, the traction wheels 37 will ride over the pawls 40 without affecting the drum 10 and consequently without disturbing the material taken up by or deposited on the gathering devices or spurs.

Mounted on the forward end of the truck are standards 42, the upper ends of which are bolted or otherwise rigidly secured to a transverse bar 43. Secured to the upper surface of the bar 43 are spaced vertically disposed brackets 44 having rearwardly extending arms 45, the latter being provided with slotted ears 46 for engagement with the upper ends of the brackets 44, said brackets and arms forming in effect a rigid auxiliary supporting frame for the elevating conveyers 47 and 48. The rear conveyer 47 comprises spaced side plates 49 having transverse shafts 50 journaled therein and to which are secured sprocket wheels 51 for engagement with sprocket chains 52. Secured to the sprocket chains 52 are transverse flights 53, each preferably formed of a single strip of metal having one end thereof provided with an angularly disposed lip 54 adapted to receive and elevate the manure.

The side plates 49 of the rear conveyer 47 are bolted or otherwise rigidly secured to the arms 45 of the auxiliary frame, while the side pieces 55 of the front conveyer 48 are pivotally mounted on the arms 45 so as to allow a slight lateral movement of one conveyer relatively to the other. The front conveyer 48 is similar in construction to the rear conveyer 47 and co-acts therewith to elevate the material collected by the gathering devices or spurs 12 so that the material may be discharged directly onto a spreader or directed by a chute 56 to a wagon or other vehicle adapted to receive the same.

It will here be noted that as the conveyers 47 and 48 are rotated, the lips 54 of the flights will register with each other and thus form in effect pockets which serve to prevent accidental displacement of the material during the elevating operation. Disposed on opposite sides of the conveyers are coil springs 57 having their opposite ends secured in any suitable manner to said conveyers so as to normally and yieldably support the conveyers in proper spaced relation, while at the same time allowing a slight lateral movement of one conveyer relatively to the other, thus to prevent injury to or breakage of said conveyers should a stone or other foreign body be carried up by the manure for delivery to the spreader or wagon.

The upper shaft 50 of each endless conveyer is extended longitudinally on one side of the frame and provided with a sprocket wheel 58 for engagement with a sprocket chain 59, the latter being extended over a sprocket wheel 60 secured to a shaft 61 journaled in the lower ends of the brackets 44.

Secured to and mounted for rotation with one of the wheels or disks 37 is a sprocket wheel 62, which latter is connected through the medium of a sprocket chain 63 with a relatively small sprocket wheel 64 secured to or formed integral with the sprocket wheel 60, thus to transmit motion from the traction wheel or disk 37 to the sprocket wheel 64 and thence through the medium of the sprocket chain 59 to the sprocket wheels 58 to actuate the co-acting conveyers 47 and 48.

Journaled in suitable bearings in the rear ends of the arms 45 is a transverse shaft 65 having spaced friction disks 66 mounted on the opposite ends thereof and normally and yieldably supported in contact with each other by coil springs 67. One of the friction disks 66 of each set is keyed or otherwise secured to the shaft 65, as indicated at 68, while the mating disk of said set is slidably mounted on the shaft, as best shown in Fig. 4 of the drawings. Secured to one end of the shaft 65 is a sprocket wheel 69 which engages the sprocket chain 59, thus to transmit motion to the shaft 65.

The inner faces of the friction disks 66 are cut-away to form registering grooves 70 adapted to receive the supporting arms 71 of the chute 56, as will be more fully explained hereinafter. The chute 56 is preferably formed in three sections 72, 73 and 74, the lower section 72 being rigidly secured to the upper supporting arm 71, while the intermediate section 73 is slidably mounted on the arm 71 and is arranged to telescope the stationary section 72, said sections being provided with angularly disposed flanges 75 adapted to interengage for limiting the extensible movement of the chute. The upper section 74 is corrugated transversely and constitutes a shaking table for agitating manure or other material deposited on the chute during the passage of the material from the conveyers 47 and 48 to a wagon or other vehicle, indicated at 76. The corrugated section or table 74 is provided with oppositely disposed side bars 77, one end of each of which is pivotally mounted on a crank pin 78 extending laterally from the sprocket wheel 58, while the opposite ends of the bars 77 are projected downwardly and thence laterally to form inwardly extending guide lips 79 which bear against the lower edges of the intermediate section 73.

Extending transversely across the free end of the terminal chute section 72, is a shaft 80 having wheels or rollers 81 journaled thereon and adapted to travel on the upper edge of the wagon box 76 during the loading operation, the chute being so arranged that the same may be extended or retracted, thus to permit loading of the wagon from either end thereof toward the center or from the center of the wagon toward either end. The rear end of the intermediate chute section 73 is provided with an upstanding lip 83 which engages a similar lip formed on the corrugated section 74, thus to limit the outward or extensible movement of said intermediate section. As a means for advancing and retracting the chute, there is provided a rocking frame 84 including spaced angularly disposed arms pivotally mounted at 85 on the arms 45 and having pivotally connected therewith at 86, slotted levers 87. Mounted for rotation on the rocking frame 84 are grooved rollers 88, there being similar grooved rollers 89 journaled on the lower ends of the slotted levers 87.

Extending laterally from the arms 45 of the auxiliary supporting frame, are pins 90 which enter the slots 91 formed in the levers 87 and serve to direct the movement of said levers when the rocking frame 84 is tilted.

The supporting arms 71 are preferably in the form of loops which embrace the transverse shaft 65, the upper and lower members or walls of the loops being movable into and out of engagement with the friction disks 67 to effect the extension and retraction of the chute.

Disposed at the rear of the conveyer 47 are coil springs 92, each having one end thereof secured to the lower end of the adjacent slotted lever 87 and its other end fastened to the side piece of said conveyer.

Secured to the upper ends of the angular arms 84 constituting the rocking frame, are converging rods 93 having a longitudinally disposed actuating rod 94 secured thereto at the junction thereof and extended to an operating lever 95 mounted on the wagon or vehicle 76. The operating lever 95 is provided with a spring catch or pawl 96 which co-acts with a notched rack 97 also secured to the wagon 76 for the purpose of locking the lever in different positions of adjustment. Thus it will be seen that by moving the lever 95 in the direction of the arrow indicated in Fig. 2 of the drawings, the springs 92 will force the upper legs of the chute supporting loops or arms 71 downwardly between the adjacent disks 66 so as to cause said disks 66 to frictionally engage the loops or arms and thus move said arms in the direction of the wagon so as to advance the chute over the body of the wagon, and thereby insure a uniform distribution of the material within the wagon.

When the operating lever 95 is in a central or neutral position, the rollers 87 and 89 will support the loops or arms 71 out of engagement with the friction disks 66 so as to permit the loading of the wagon without affecting the chute. When the operating lever is moved to a position directly opposite to that indicated by the arrow in Fig. 2 of the drawings, the rocking frame will be oscillated on the arms 45 of the rigid auxiliary frame, thus moving the lower members of the loops or arms 71 upwardly into engagement with the lower faces of the friction disks 66 and thus effect the retraction of the chute. If desired however, the loops or arms 71 may be in the form of a rack and suitable gear wheels may be substituted for the friction wheels 66 for engagement with the racks, thereby positively to move the chute to extended and retracted positions.

The forward ends of the arms 45 are preferably bent inwardly and provided with perforations 98 to which may be attached brace rods extending to the wagon or other vehicle, thus to assist in supporting the loading device in position thereon.

The forward end of the supporting frame 5 is provided with converging bars 99 terminating in an eye or loop 100 for attachment to the axle of the wagon or other vehicle 76 so as to support the loader in proper relation to the wagon regardless of surface conditions.

In operation, the loader is attached to the wagon 76 and the chute 56 adjusted manually to effect the loading of the wagon either from the center thereof or from either end of the wagon toward the center. The lever 15 is then actuated to lower the supporting frame carrying the revolving drum or cylinder so as to cause the spurs or gathering devices to engage the ground. As the machine travels over the surface of a field, the spurs or gathering devices 12 will be moved to extended position at predetermined intervals, thus to collect the manure or other material and elevate the same above the drum where the manure will be taken up by and between the conveyers 47 and 48 and delivered to the chute 56 and thence to the wagon or other vehicle 76. During the travel of the loader, motion will be transmitted from the traction disks 37 through the medium of the sprocket chains 63 and 59 to the co-acting conveyers, and through the medium of the rods 77 and sprocket wheels 58 to the shaking table 74, thus to oscillate the latter and effect the movement of the material in the chute and thus prevent clogging of the latter.

If a center feed is desired, the chute is adjusted manually until the outer chute section 72 registers with the center of the wagon, when by moving the lever 95 either forward or backward, the material may be fed toward either end of the wagon. Conversely, the lower section 72 of the chute may be positioned at either end of the wagon and the material fed toward the center thereof.

When the loader is employed for delivering manure or other material to a spreader, the chute 56 is dispensed with, the material being fed directly from the conveyers 47 and 48 to the endless conveyer of the spreader, as will be readily understood.

Having thus described the invention, what is claimed as new is:

1. In a machine of the class described, a wheeled truck, a drum mounted for rotation on the truck, gathering devices carried by the drum, traction disks independent of the truck wheels disposed on opposite sides of the drum, co-acting conveyers adapted to receive the material from the gathering devices, and means for transmitting motion from the traction disks to the conveyers.

2. In a machine of the class described, a wheeled truck, a drum mounted for rotation on the truck, gathering devices carried by the drum and movable to extended position at predetermined intervals, a traction disk independent of the truck wheels disposed on one side of the drum, a pawl for locking the traction disk in engagement with the drum when the machine is traveling in one direction and movable out of engagement with the disk when the machine is traveling in the opposite direction, a conveyer, and means for transmitting motion from the traction disk to the conveyer.

3. In a machine of the class described, a wheeled truck, a drum mounted for rotation on the truck and provided with peripheral openings, gathering devices normally housed within the drum and movable to extended position through said openings, a disk independent of the truck wheels disposed on one side of the drum and provided with peripheral traction devices, co-acting conveyers supported on the truck above the drum and adapted to receive the material collected by the gathering devices, and means for transmitting motion from the disk to the conveyer.

4. In a machine of the class described, a supporting frame, a stationary transverse shaft carried by the frame and provided with oppositely disposed trunnions, a drum mounted for rotation on the trunnions and provided with gathering devices movable to extended position at predetermined intervals, an axle extending through the shaft and provided with opposite disposed crank arms, links pivotally connected with the crank arms, bars forming a connection between the links and frame, spindles extending laterally from the links at their points of attachment to the bars, ground wheels journaled on the spindles, a conveyer mounted on the frame above the drum and constructed to receive the material collected by the gathering devices, means for transmitting motion from the drum to the conveyer, an operating lever secured to the crank shaft on one side of the frame, and a spring actuated locking lever carried by the operating lever and adapted to engage the supporting frame for holding said supporting frame in lowered position.

5. In a machine of the class described, a wheeled truck, a drum mounted for rotation on the truck and provided with gathering devices, traction disks independent of the truck wheels disposed on opposite sides of the drum, co-acting conveyers mounted above the drum and adapted to receive the material from the gathering devices, a sprocket wheel secured to one of the traction disks, sprocket wheels carried by the conveyers, one of said sprocket wheels being provided with a crank pin, a sprocket chain engaging the sprocket wheel on the traction disk and sprocket wheels of the conveyer respectively, for transmitting motion from one to the other, an extensible chute, and a shaking table slidably mounted on the chute and provided with oppositely disposed arms for attachment to said crank pin.

6. In a machine of the class described, a truck including a main frame, a drum mounted for rotation on the main frame, gathering devices carried by the drum, an auxiliary frame, a conveyer mounted on the auxiliary frame and constructed to receive the material collected by the gathering devices, a shaft journaled in the auxiliary frame and provided with friction disks, a chute having rearwardly extending arms embracing the friction disks, means for transmitting motion from the drum to the shaft and conveyer, respectively, and means for moving the chute supporting arms into and out of engagement with the friction disks, thereby to extend or retract the chute.

7. In a machine of the class described, a truck including a main frame, a drum mounted for rotation on the main frame, gathering devices carried by the drum, an auxiliary frame, a conveyer, a shaft journaled in the auxiliary frame, a chute, means for transmitting motion from the drum to the conveyer and shaft, respectively, loops extending laterally from the chute, and means pivotally mounted on the auxiliary frame for moving the legs of the loops into and out of engagement with the shaft, thereby to advance or retract the chute.

8. In a machine of the class described, a truck including a main frame, a drum mounted for rotation on the main frame, gathering devices carried by the drum, an auxiliary frame, a shaft journaled in the auxiliary frame, a conveyer carried by said auxiliary frame and constructed to receive the material collected by the gathering devices, a chute having rearwardly extending arms embracing the shaft, a rocking frame pivotally mounted on the auxiliary frame, rollers carried by the rocking frame and adapted to move the chute arms into and out of engagement with the shaft for advancing or retracting the chute, and means for transmitting motion from the drum to the conveyer and shaft, respectively.

9. In a machine of the class described, a truck including a main frame, a drum mounted for rotation on the main frame, gathering devices carried by the drum, an auxiliary frame, co-acting conveyers mounted on the auxiliary frame, a transverse shaft journaled in the auxiliary frame, a chute having rearwardly extending supporting loops embracing the shaft, friction disks having peripheral grooves adapted to receive the opposite legs of the loops for advancing and retracting the chute, and a rocking frame pivotally mounted on the auxiliary frame and provided with spaced rollers adapted to bear against the opposite legs of the loops for moving either leg thereof into engagement with the friction disks of said shaft.

10. In a machine of the class described, a truck including a main frame, a drum mounted for rotation on the main frame, gathering devices carried by the drum, an auxiliary frame, co-acting conveyers mounted on the auxiliary frame, a chute disposed on one side of the conveyers and provided with rearwardly extending loops, a shaft journaled in the auxiliary frame and extending through the loops of the chute, a rocking frame pivotally mounted on the auxiliary frame and including angularly disposed arms, slotted levers pivotally connected with said arms, pins extending laterally from the auxiliary frame and within the slots of the levers, rollers carried by the angular arms and slotted levers, respectively, for engagement with the legs of the loops, means for transmitting motion from the drum to the conveyers and shaft, respectively, and means for actuating the rocking frame, thereby to move either leg of the loops into and out of engagement with the shaft to advance or retract the chute.

11. In a machine of the class described, a truck including a main frame, a drum mounted for rotation on the main frame, gathering devices carried by the drum, an auxiliary frame, a conveyer mounted on the auxiliary frame, a shaft journaled in the auxiliary frame, a chute having rearwardly extending arms embracing the shaft, a rocking frame pivotally mounted on said auxiliary frame and including angularly disposed arms, levers pivotally connected with the angular arms of the rocking frame and each having a pin and slot connection with the auxiliary frame, rollers carried by the slotted levers and angular arms of the rocking frame, respectively, springs connecting the slotted levers and conveyer, means for actuating the rocking frame to move the arms into and out of engagement with the shaft, and means for transmitting motion from the drum to the conveyer and shaft, respectively.

12. In a machine of the class described, a truck including a frame, a drum mounted for rotation on the frame, gathering devices carried by the drum, a conveyer arranged above the drum, a shaft, means for transmitting motion from the drum to the conveyer and shaft, respectively, a chute, loops extending laterally from the chute, and means pivotally mounted on the frame for moving the legs of the loops into and out of engagement with the shaft, thereby to advance or retract the chute.

13. In a machine of the class described, a wheeled truck, a gathering device mounted for rotation on the truck, a traction disk independent of the truck wheels arranged on one side of said gathering device, coacting conveyers adapted to receive the material from the gathering device, and means for transmitting motion from the traction disk to said conveyers.

In testimony whereof, I affix my signature in presence of two witnesses.

EDWARD M. WARRENFELTZ. [L. s.]

Witnesses:
J. W. SCHMEBLY,
J. A. MULLENDORE.